United States Patent

Raskin

[15] 3,668,526

[45] June 6, 1972

[54] COMMUNICATION SYSTEM HAVING MEANS FOR CAUSING A DISTRESS SIGNAL

[72] Inventor: Jerome S. Raskin, 20661 Suburbia Lane, Huntington Beach, Calif. 92646

[22] Filed: Sept. 12, 1969

[21] Appl. No.: 857,496

[52] U.S. Cl. ..........325/64, 179/41 A

[51] Int. Cl. ..........H04b 7/00

[58] Field of Search ..........179/41 A; 325/16, 64

[56] References Cited

UNITED STATES PATENTS

| | | | |
|---|---|---|---|
| 3,339,141 | 8/1967 | Rothenbuhler | 325/64 X |
| 3,274,518 | 9/1966 | Hoover | 325/186 X |
| 3,290,597 | 12/1966 | Denny | 325/64 |

*Primary Examiner*—Ralph D. Blakeslee
*Attorney*—Noel G. Conway

[57] ABSTRACT

A communication system including a short range hand held transmitter having the capability of transmitting an intelligence signal on one basic frequency and a steady signal on a second separate basic frequency to a vehicle located a short distance away, and a transceiver-input unit which is plugged into a standard transceiver in the vehicle, which unit is responsive to said one frequency signal to cause said transceiver to broadcast to a remote point the intelligence signal. Said unit is responsive to said second frequency signal to turn on the vehicle siren and lights, and also to change said constant signal into brief coded signals which are broadcasted by said transceiver at regular intervals with each brief coded signal being no more than 33⅓ of the interval between two brief coded signals. Said units turns on the transceiver one-quarter second before the beginning of the brief coded signal and turns the transceiver off immediately upon conclusion of the brief coded signal. The transmitter broadcasts a carrier wave which is pulse coded around said one basic frequency by a subcarrier which is frequency modulated by the intelligence input into the transmitter.

21 Claims, 8 Drawing Figures

INVENTOR.
JEROME S. RASKIN
BY
Noel G. Conway
ATTORNEY

INVENTOR.
JEROME S. RASKIN
BY
Noel G. Conway
ATTORNEY

INVENTOR.
JEROME S. RASKIN
BY
Noel G. Conway
ATTORNEY

COMMUNICATION SYSTEM HAVING MEANS FOR CAUSING A DISTRESS SIGNAL

This invention relates to communication systems and more particularly to a communication system having means for causing a distress signal.

Embodiments of the present invention are primarily used by police officers, which systems are effectively added on to the standard transceiver in a police vehicle. However, they can be also used beneficially by other persons such as firemen.

The standard vehicle carried transceiver accomplishes its function of carrying communication between the vehicle and the base radio dispatcher. However, such systems have the limitation that the person using the transceiver can be no further away from the transceiver than the length of the cord on the microphone of the transceiver. This problem is particularly acute in the case of police officers who must leave their vehicle for purposes of, e.g., interrogating a driver of a stopped vehicle. In such case, if the driver of the stopped vehicle were to start shooting at the police office, the police officer must make his way back to his vehicle in order to report the incident to the radio dispatcher and call for help. In making his way back to the vehicle, he is exposed to danger.

Additionally, present transceivers have the disadvantage that—even in the absence of a dangerous situation such as mentioned above—the police officer must return to his vehicle to communicate with the radio dispatcher for purposes of, e.g., checking out information he receives from the driver of the stopped vehicle. This is time consuming and inconvenient. Embodiments of the present invention overcome these disadvantages in that they include a small, lightweight remote transmitter carried by the officer, and a transceiver-input unit which can be plugged into the input jack of the standard transceiver. Intelligence signals on a first frequency are fed into the transceiver-input unit which then feeds the intelligence signal into the transceiver the same as if the standard microphone of the transceiver were used. This permits the officer to communicate from a position remote from the vehicle.

Additionally, the remote transmitter carried by the officer has provision for broadcasting a continuous signal at a second frequency and the transceiver-input unit has an intermediate actuation means therein for causing a brief coded signal to be broadcast over the transceiver at regular intervals with the transceiver being keyed to transmit only from one-fourth second before the brief signal to the end of the period of the brief signal. This is even though the brief coded signals vary from one-fourth second to 3¾ seconds in length. Thereby, this distress signal will not prevent other vehicles from communicating with each other and the radio dispatcher during the interval between the brief coded signals.

Further, the transceiver-input unit intermediate actuation means—upon receipt of said second frequency signal from the remote transmitter—causes the lights of the vehicle to flash and the siren of the vehicle to be operated. This assists other police vehicles in locating the particular vehicle involved, and also tends to make the person which caused the officer to transmit the distress signal, to desire to leave the scene.

With the foregoing in mind, it is a major object of this invention to provide an improved communication system.

It is another object of this invention to provide an improved communication system which would permit a person to transmit through a vehicle-carried transceiver a message from a position a considerable distance away from the transceiver.

A further object of this invention is to provide a communication system including a transceiver wherein there is included means for sending through the transceiver a series of brief coded signals at regular intervals with provision that the transceiver is only keyed to transmit during the period of each brief coded signal so that the transceiver does not block out transceivers in other vehicles.

It is still another object of this invention to provide a low cost, easily maintained remote transmitter which has provision for sending an intelligence on one frequency and a distress signal on another frequency.

It is a still further object of this invention to provide a lightweight, compact remote transmitter suitable to be carried by a person.

Still another object of this invention is to provide an improved communication system having a standard transceiver having provision for transmitting messages received from a transmitter located on a person a considerable distance away from the transceiver.

Other and further objects of this invention will become apparent in the detailed description below in conjunction with the attached drawings wherein.

Figures 6, 7, 8:
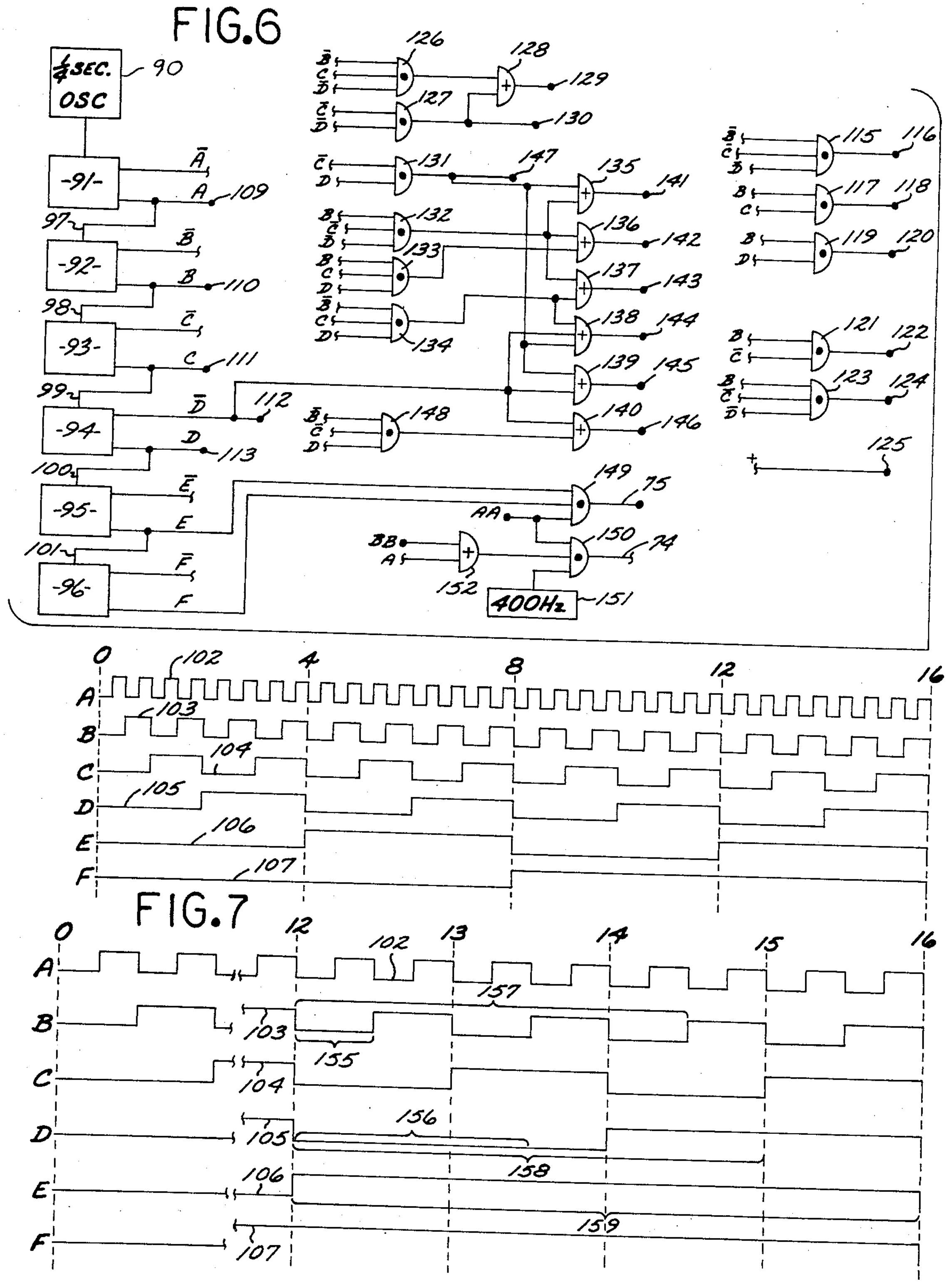
FIG. 6 is a schematic diagram of a preferred form of the coded beep logic circuitry of the present invention.

FIG. 7 discloses the square waves generated by input flip-flops of the logic circuitry disclosed in FIG. 6; and FIG. 8 is an enlarged partial view of the square waves disclosed in FIG. 7.

Figures 1, 2, 3:
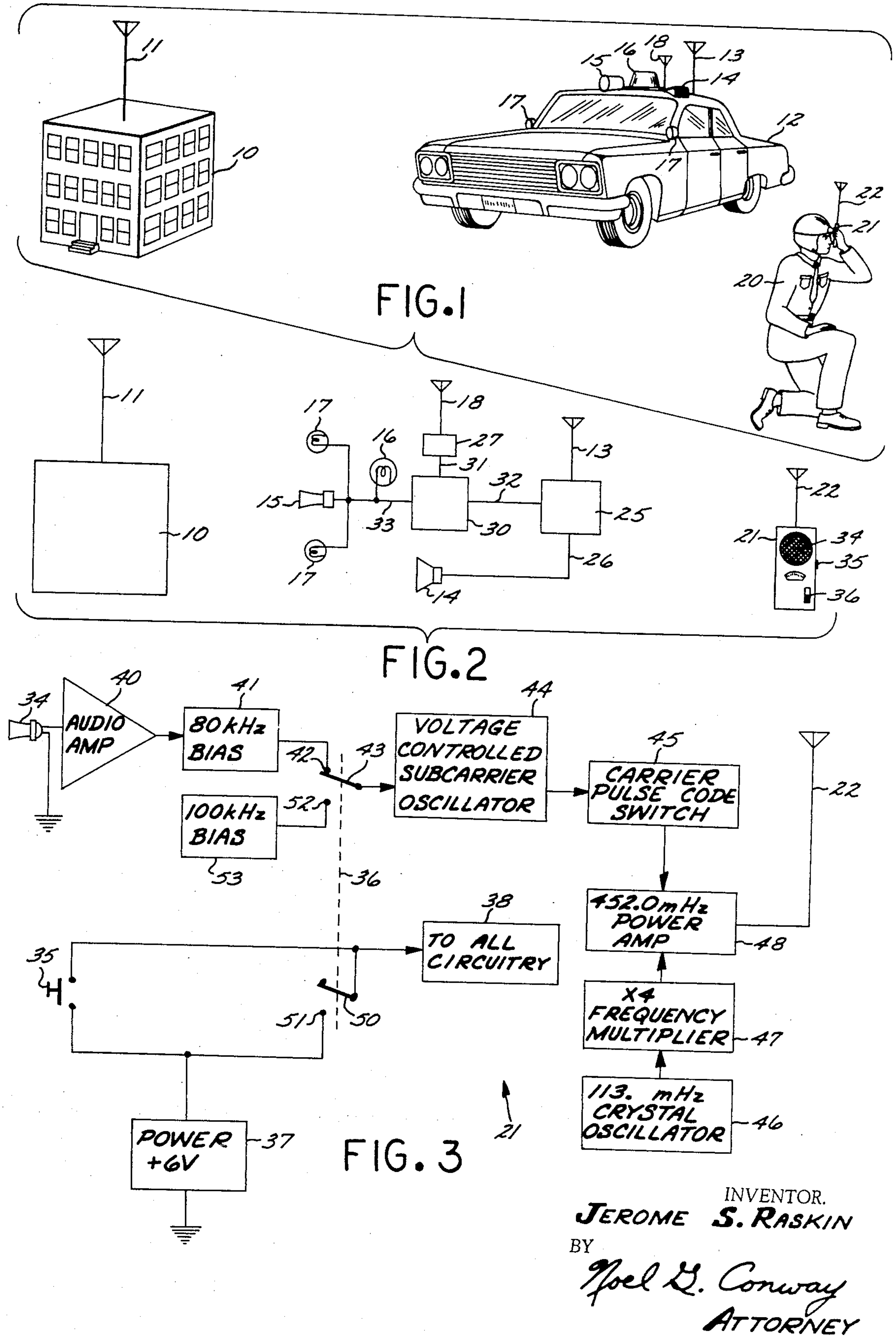
FIG. 1 is a pictorial view of an overall system in which the present invention is used.
FIG. 2 is an overall block diagram of a system in which a preferred form of the present invention is used.
FIG. 3 is a block diagram of a preferred form of the remote transmitter used in the present invention.

Referring now to FIG. 1, there is shown an overall view of the system incorporating the present invention. As shown there, the overall system includes a police station having a basic transceiver unit therein (not shown) which receives and sends signals through an antenna 11.

Those signals to and from the police station 10 are sent to the police vehicles in the field—illustrated by police vehicle 12 in FIG. 1. The vehicle 12 receives signals from the antenna 11 and sends signals to the antenna 11 via an antenna 13 on the police vehicle as is standard. Further, the police vehicle 12 has an outside speaker 14 and a siren 15 which are standard, as are revolving top light 16 and spotlights 17. The manner of operation of these last mentioned accessories will be described in further detail below.

The vehicle 12 also has a special antenna 18. It is through this antenna 18 that a police officer 20 may transmit the signals from the remote transmitter 21 through antenna 22 on the remote transmitter. This remote transmitter 21 has the capability of broadcasting a message approximately 500 feet, then, by means to be described, that message may be relayed to the police station 10.

Referring now to FIG. 2, there is shown in block diagram the connection of the equipment in the vehicle 12 used with the present embodiment. Said equipment includes a standard transceiver 25 which is connected by a standard line 26 to the outside speaker 14. The transceiver-input unit includes a special receiver 27, preferable located in the roof area of the vehicle 12, which last mentioned receiver is connected to intermediate actuation means 30 by means of line 31. The manner of operation of the intermediate actuation means 30 will be described in further detail below. At this point, however, it will be pointed out that the intermediate actuation means 30 is connected to the standard transceiver 25 to send a signal through the antenna 13 as illustrated by line 32. ALso, as indicated by line 33, the intermediate actuation means 30 is connected to the siren 15, the revolving top light 16, and the spotlights 17 to actuate them.

As will be described in further detail below, the remote transmitter 21 includes a microphone 34 into which an officer 20 will speak when he desires to transmit a message. A push-to-talk switch 35 is positioned so that the officer 20 can depress that switch when he desires to transmit his message. As mentioned above, and will be described in further detail below, the remote transmitter has a capability of transmitting over one of two frequencies. To this end, there is provided a double pole double throw switch 36 which functions to select the frequency over which the remote transmitter 21 will broadcast.

Referring now to FIG. 3, there is shown in block diagram a preferred form of the remote transmitter 21. This particular remote transmitter 21 has the advantage that the unit can be economically produced, and the resulting transmitter can withstand the rugged use to which such remote transmitter would be subjected. Further, the circuitry of the remote transmitter 21 minimizes the amount of power used by the transmitter, and permits the use of a transceiver-input unit which is very selective to respond only to signals from the remote transceiver.

As shown in FIG. 3, when the switch 36 is in the position illustrated, power from battery 37 is fed to all circuitry (indicated by block 38) of the transmitter 21 when the push-to-talk switch 35 is depressed.

As also shown in FIG. 3, the output of the microphone 34 goes through an audio amplifier 40 into an 80 kHz bias, from where it passes through contact 42 and switch arm 43 of the switch 36 into voltage controlled subcarrier oscillator 44. That is, the subcarrier oscillator 44 has such standard circuitry that it will oscillate basically at 80 kHz when connected to the 80 kHz bias 41 and the voltage output of the microphone 34 is steady. However, variations in the voltage of the microphone 34 output (caused by a person speaking into it) will vary the frequency of the output of the oscillator. From the oscillator 44, the signal (with the intelligence output of the audio amplifier 40) is fed into a carrier pulse code switch 45 for a purpose to be described.

In order that the remote transmitter will transmit more efficiently, it is necessary to broadcast the signal at a higher frequency. To this end, the remote transmitter 21 is provided with a 113 mHz crystal oscillator 46, the output of which is multiplied by multiplier 47 and fed into 452 mHz power amplifier 48 which is connected to the carrier pulse code switch 45.

The pulse code switch 45 "pulse codes" the carrier wave by turning power off from the power amplifier during one half of each cycle. Thereby, the remote transmitter 21 consumes power during only one-half of the time—thus reducing power consumption by 50 percent. This reduces the size of batteries necessary in the remote transmitter 21—thus reducing the size and weight of the transmitter. From the power amplifier 48, the carrier wave with the intelligence of the subcarrier imposed thereon by pulse coding is broadcast through the antenna 22 when the push-to-talk switch 35 is depressed.

At such time as the officer 20 desires to generate a distress signal, he switches the switch 36 to the position where switch arm 50 engages contact 51. At such time, the battery 37 supplies continuous power to all circuitry 38. Such switching of the switch arm 36 also causes switch arm 43 to engage contact 52—thus connecting 100 mHz bias 53 to the subcarrier oscillator 44. As there is no varying voltage input into the oscillator 44, the output of the oscillator causes the carrier pulse code switch 45 to pulse code the carrier at a steady 100 kHz, which pulse coded carrier is supplied to the radiated from the antenna 22.

Figure 4:
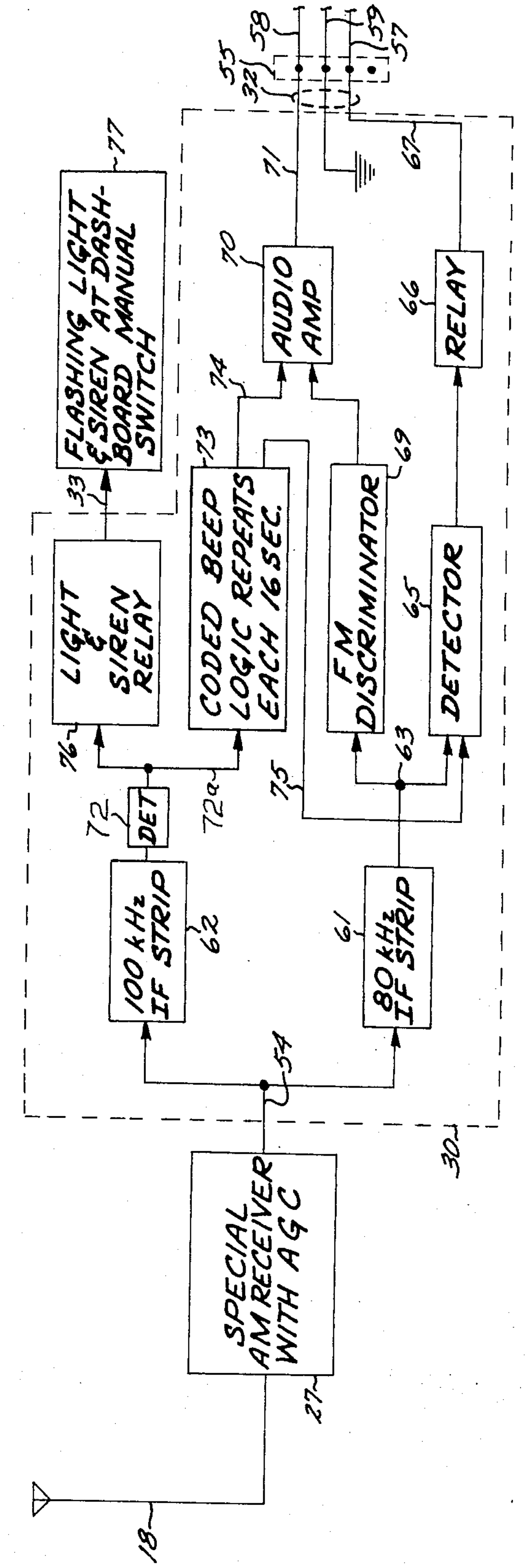
FIG. 4 is a more detailed block diagram of a preferred form of the intermediate actuation means of the transceiver-input unit of the present invention.

Referring now to FIG. 4, the transceiver-input unit will be described further. The signal received by the antenna 18 is led into a special AM receiver 27 which has automatic gain control. This receiver 27 will be described in further detail below. At this point, suffice it to say that the output of the receiver 27 is fed through line 54 into the intermediate actuation means 30. And, the output of the intermediate actuation means 30 is connected to a jack, indicated by the dash line 55. This jack 55 plugs into the standard four-pin receptacle of the standard transceiver unit 25. As is normal, the standard transceiver 25 has three input lines to it. First input line 57 of the transceiver 25 is such that—when a signal is received over it—the transceiver will broadcast any signal received into the transceiver through second input lines 58. The push-to-talk switch of the normal microphone is connected to first input line 57. Common line 59 of the transceiver 25 is normally connected to the common line of a hand held microphone. In this case, it is connected to ground in the intermediate actuation means 30.

As can be seen in FIG. 4, the signal from the receiver 27 is fed into an 80 kHz IF strip 61 and a 100 kHz IF strip 62. When the remote transmitter 21 is generating an 80 kHz frequency modulated subcarrier, the 80 kHz IF strip 61 will function to amplify the signal therefrom. From the 80 kHz IF strip 61, the signal is fed to connection 63.

Circuit means must be provided in order to actuate the transceiver 25 at the desired times. To this end, the signal is fed from the connection 63 into a detector 65 which operates a relay 66 such that—when detector 65 detects a signal—the relay 66 is actuated to provide an actuating signal through line 67 to the above mentioned first input line 57 of the transceiver 25—thus actuating the transceiver.

In order to provide the intelligence signal through the transceiver 25, the connection 63 is also connected to an FM discriminator 69. The FM discriminator 69 functions in the normal manner to create an audio signal, and the output thereof is fed into audio amplifier 70. The amplified signal is fed from the amplifier 70 through line 71 into second input line 58 of the transceiver 25.

As is normal with IF strips, the 100 kHz IF strip 62 will amplify any signal received with a 100 kHz subcarrier (but not an 80 kHz subcarrier). From the 100 kHz IF strip 62, the signal is fed into a detector 72. The output of the detector 72 is connected through line 72*a* into a coded beep logic circuitry 73 and causes it to operate when the detector detects a signal.

The coded beep logic circuitry will be described in further detail below. Suffice it to say at this time that it has two outputs. The first output is a coded beep of dots (one-fourth second long) and/or dashes (three-fourths second long) separated by one-fourth second intervals—which will indicate the particular vehicle 12 involved. This signal will appear at line 74, and is fed through audio amplifier 70 into second input line 58 of the transceiver 25. The other output is a steady signal which will appear at line 75 one-fourth of a second before the coded beep signal appears at line 74. This signal is fed by the line 75 through the detector 65 into the relay 66 in order to cause the transceiver 25 to broadcast as previously mentioned.

It should be mentioned at this point that the coded beep logic circuitry is such that it repeats itself every 16 seconds with the coded beeps appearing in the last 4 seconds of the 16-second cycle. These signals will vary from one-fourth second (for a signal of one dot) to 3¾ seconds (for a signal of one dash, four dots, and one dash). And, because the transceiver 25 is turned on only one-fourth second before the coded signal, the transceiver 25 will interfere with other transceivers not more than 25 percent of the time even though the signal from the remote transmitter 21 is continuous. If the signal from the transceiver 25 were continuous, it would prevent—or at least seriously interfere with—the operation of other police vehicles in the area. This would seriously hamper the ability of officers in other police vehicles to perform their function.

It is also desired that the distress signal from the remote transmitter 21 cause such a commotion at the scene that the person who caused the officer to transmit the signal will want to leave the scene. To this end, the output of the detector 72 is connected also into light and siren relay 76 to cause said relay to close its switches when a signal is detected by detector 72. The output of the light and siren relay is preferably connected across the normal dashboard manual switch 77 of the revolving top light, spotlights, and siren to cause said accessories to operate when said relay switches are closed. Thereby no special modification of the existing equipment is needed in order to operably connect embodiments of the present invention to it.

Figure 5:
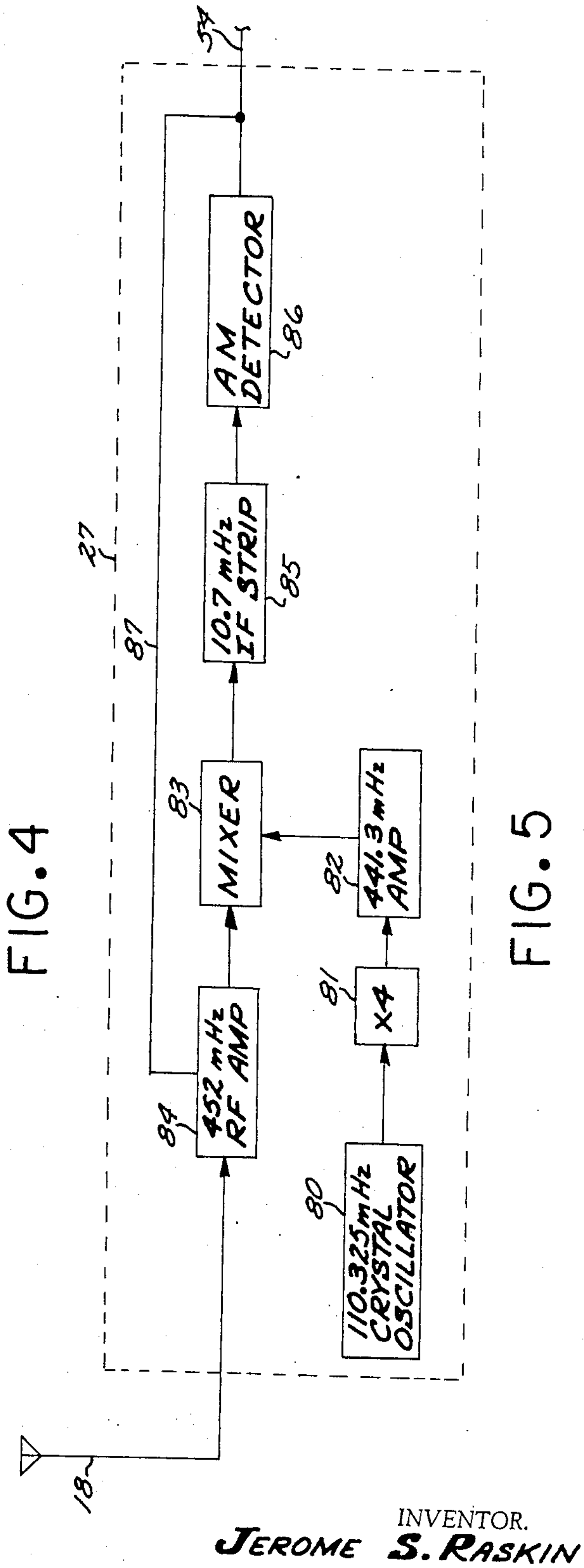
FIG. 5 is a block diagram of a preferred form of the special receiver of the transceiver-input of the present invention.

Referring now to FIG. 5, the receiver 27 will be described in further detail. The receiver 27 feeds the signal received by the antenna 18 into a 452 mHz RF amplifier 84. IT is desired to reduce the effective frequency of the signal for more efficient amplification. To this end, a 110.325 mHz crystal oscillator 80 is provided, the output of which is fed through a frequency multiplier 81 into a 441.3 mHz amplifier 82. The output of the amplifier 82 is then mixed with the output of the RF amplifier 84 in mixer 83, from whence the signal is fed through 10.7 mHz IF strip 85 to AM detector 86. The output of the AM detector 86 is fed through line 54 to the circuitry previously described. Also, the output of the detector 86 is fed through feedback line 87 to the RF amplifier 84 in order to give the receiver 27 automatic gain control.

Referring now to FIG. 6, the logic circuitry which accomplishes the coded beep will be described in further detail. The preferred logic circuitry shown is designed to accommodate vehicles in sets of 18. That is, the circuitry can accommodate 18 different combinations of dots and dashes which will be broadcast at a given frequency. However, as will be mentioned further below, the basic circuitry can accommodate additional sets of 18 cars by providing that the beep is broadcast at a different frequency for each set of 18 cars. This makes the system much more versatile without increasing the cost of construction.

As shown in FIG. 6, a timing device, preferably in the form of a one-fourth second oscillator 90 along with flip flops 91 to 96 is provided. The presence of a signal on line **72*a* causes power to be supplied to all of the components thereof, i.e., the oscillators, flip flops and gates. As can be seen, the output of the oscillator 90 is connected into the flip flop 91 to cause the flip flop to change every one-fourth second from one of its states to the other state, e.g., from A to $\overline{A}$. The output A of the flip flop 91 is connected through line 97 to the flip flop 92 and causes this last mentioned flip flop to change state each time the flip flop 91** changes from A.

Similarly, the flip flop 93 is connected to the output B of the flip flop 92 through line 98 so as to change state each time the flip flop 92 changes from B, and flip flop 94 is connected to output C of the flip flop 93 by line 99 so that the flip flop 94 changes state each time the flip flop 93 changes from C. In the same manner, flip flop 95 is connected through line 100 to output D of the flip flop 94 and the flip flop 95 changes state each time the flip flop 94 changes from D. The flip flop 96 is connected through line 101 to output E of the flip flop 95 for the same purpose. With this circuitry, it can be seen that the flip flop 91 changes state every one-fourth second, the flip flop 92 changes state every one-half second, the flip flop 93 changes state every second, the flip flop 94 changes state every 2 seconds, the flip flop 95 changes state every four seconds, and the flip flop 96 changes state every 8 seconds. Therefore, the logic circuitry will repeat itself every 16 seconds.

In FIG. 7, there is shown the square waves generated by the flip flops 91 to 96 during the 16-second cycle of the logic circuitry 73. As can be seen, square wave 102 of flip flop 91 changes every one-fourth second; square wave 103 of flip flop 92 changes every half second; and square wave 104 of flip flop 93 changes every second; square wave 105 of flip flop 94 changes every 2 seconds; square wave 106 of flip flop 95 changes every 4 seconds, and square wave 107 of flip flop 96 changes every 8 seconds.

As will be developed below, all of the transmission of the coded beeps occurs in the last 4 seconds of the 16-second cycle. Therefore, in FIG. 8, the square waves 102 to 107 have been shown with this portion of the cycle in an expanded scale.

The logic circuitry 73 further includes a terminal 109 on output A of flip flop 91, a terminal 110 on output B of flip flop 92, a terminal 111 on output C of flip flop 93, a terminal 112 on output $\overline{D}$ of flip flop 94, and a terminal 113 on output D of flip flop 94. The manner in which these terminals are connected into the operation of the circuitry will be explained further below.

The logic circuitry 73 includes a number of AND gates and OR gates which are connected to the outputs of the flip flops 91–96 as indicated in FIG. 6. In FIG. 6, it will also be noted that the logic circuitry 73 includes AND gate 115 which will supply a signal at terminal 116 when $\overline{B}$, $\overline{C}$, and $\overline{D}$ are presented. Also, there is included an AND gate 117 which will provide an output signal at terminal 118 when B and C are presented by flip flops 92 and 93.

The logic circuitry 73 further preferably includes an AND gate 119 which will provide an output signal at terminal 120 when the B and D are presented. The circuitry 73 also includes an AND gate 121 which will provide an output signal at terminal 122 when B and $\overline{C}$ are presented, and an AND gate 123 which will provide an output signal at terminal 124 when the B, $\overline{C}$ and $\overline{D}$ are presented. In addition, the circuitry 73 preferably includes a plus voltage at terminal 125 for a purpose to be described.

The logic circuitry 73 also includes AND gate 126 which is responsive to inputs of $\overline{B}$, C and $\overline{D}$, and AND gate 127 which is responsive to inputs of $\overline{C}$ and $\overline{D}$. As can be seen, the output of the AND gate 126 is fed into OR gate 128 which will provide a signal at terminal 129 when either of the AND gates 126 or 127 provide an output. It will also be noted that the AND gate 127 is connected to terminal 130 as well as the OR gate 128.

The logic circuitry 73 also preferably includes: AND gate 131, which is responsive to inputs of $\overline{C}$ and D; AND gate 132, which is responsive to inputs of B, $\overline{C}$ and $\overline{D}$; and AND gate 133, which is responsive to inputs of B, C and D. The logic circuitry 73 is also provided with AND gate 134 which is responsive to inputs of $\overline{B}$, C and D.

The logic circuitry 73 is further provided with OR gates 135 to 140 which have their outputs connected to terminals 141 to 146 respectively. The AND gate 131 has its output connected to terminal 147 as well as the OR gates 135, 138 and 139, while the AND gate 132 has its outputs connected to the OR gates 135, 136 and 137. Additionally, the AND gate 133 has its output connected to the OR gate 136 while the AND gate 134 has its output connected to the OR gates 137 and 138. With this arrangement, a signal appears at the terminal 141 when a signal appears on the output side of either AND gate 131 or AND gate 132; a signal appears at terminal 142 when a signal appears at the output side of either AND gate 132 or AND gate 133; a signal appears at terminal 143 when a signal appears at the output side of either AND gate 132 or AND gate 134. The output $\overline{D}$ of the flip flop 94 is connected into the OR gate 138, 139, and 140. Also, there is provided an AND gate 148 which is responsive to $\overline{B}$, $\overline{C}$ and D, and has its output connected into the OR gate 140.

Therefore: a signal appears at terminal 144 when there is a signal on the output side of the AND gate 131, or the AND gate 134, or the $\overline{D}$ side of the flip flop 94; a signal appears at terminal 145 when a signal appears at the output side of the AND gate 131 or the $\overline{D}$ side of the flip flop 94; and a signal appears at terminal 146 when there is a signal on the output side of the AND gate 148 or the $\overline{D}$ side of the flip flop 94.

In addition to the foregoing circuitry, the logic circuitry 73 includes AND gates 149 and 150 which have their outputs connected to lines 75 and 74 respectively. The AND gate 149 is connected to the E output of the flip flop 95 and the F output of flip flop 96, and transmit terminal AA. Therefore, said AND gate 149 will provide a signal on line 75 when there is a signal at the E side of the flip flop 95 and the F side of the flip flop 96 and the terminal AA. The AND gate 150 is connected on its input side to the terminal AA and a 400 Hz oscillator 151 and OR gate 152. It will be noted that the OR gate 152 has its input side connected to a beep logic terminal BB and to the A side of the flip flop 91. Accordingly, a 400 Hz signal will appear on line 74 when there is a signal from terminal AA, and from the oscillator 151, and a signal from either terminal BB or the A side of the flip flop 91.

By connecting jumper wires from terminal AA and terminal BB to appropriate ones of the other terminals, the circuitry 73 will generate any desired beep code. The following Table A discloses the signal emitted, the logic required, and the terminal connected to terminal AA, as well as, the terminal connected to terminal BB. In Table A, only the outputs of flip flops 91 to 94 are considered because the circuitry always requires for broadcasting that flip flops 95 and 96 be in their E and F states respectively.

It will be noted that car unit No. 10 and 15 each have the same signal, to wit, two dashes. However, it is preferred that the signal be oriented to the unit numbers as shown, and merely eliminate unit No. 10. If this is done, the code can be more easily recalled by the officer in the field.

The first four unit numbers are easy to remember, as there is simply the number of dots corresponding to the unit number. Then, the officer must remember that a single dash has a value of 5. And, if the officer hears one to four dots before a dash, he merely mentally assigns the value of 5 to the dash and adds to it the number of dots that he receives. If the officer hears a dash with one or more dots after it, he merely assigns the value of 10 to the dash and counts the number of dots involved. For example, unit No. 14 has a signal of one dash and four dots. The unit No. 15 has two dashes with the first dash meaning 10, and the second dash meaning 5. Then, if the officer hears a signal comprising one dash and then one or more dots and then another dash, the following calculation is simply made. The first dash equals 10, the last dash equals 5, and each of the dots equal 1. Therefore, the unit number 18 is one dash, three dots, and one dash.

TABLE A

| Unit No. | Terminal connected to AA | Transmit logic | Terminal connected to BB | Beep logic | Signal emitted |
|---|---|---|---|---|---|
| 1 | 116 | $\bar{B}\,\bar{C}\,\bar{D}$ | ............... | A | · |
| 2 | 130 | $\bar{C}\,\bar{D}$ | ............... | A | ·· |
| 3 | 129 | $\bar{C}\,\bar{D}$, $\bar{B}\,C\,\bar{D}$ | ............... | A | ··· |
| 4 | 112 | $\bar{D}$ | ............... | A | ···· |
| 5 | 130 | $\bar{C}\,\bar{D}$ | 110 | A, B | — |
| 6 | 129 | $\bar{C}\,\bar{D}$, $\bar{B}\,C\,\bar{D}$ | 111 | A, C | ·— |
| 7 | 112 | $\bar{D}$ | 118 | A, $\bar{B}$ C | ··— |
| 8 | 146 | $\bar{D}$, $\bar{B}\,\bar{C}\,D$ | 147 | A, $\bar{C}$ D | ···— |
| 9 | 145 | $\bar{D}$, $\bar{C}$ D | 120 | A, B D | ····— |
| 10 | 112 | $\bar{D}$ | 110 | A, B | —— |
| 11 | 129 | $\bar{C}\,\bar{D}$, $\bar{B}\,C\,\bar{D}$ | 110 | A, B | —· |
| 12 | 112 | $\bar{D}$ | 122 | A, B $\bar{C}$ | —·· |
| 13 | 146 | $\bar{D}$, $\bar{B}\,\bar{C}\,D$ | 122 | A, B $\bar{C}$ | —··· |
| 14 | 145 | $\bar{D}$, $\bar{C}$ D | 124 | A, B $\bar{C}\,\bar{D}$ | —···· |
| 15 | 112 | $\bar{D}$ | 110 | A, B | —— |
| 16 | 146 | $\bar{D}$, $\bar{B}\,\bar{C}\,D$ | 141 | A, $\bar{C}$ D, B $\bar{C}\,\bar{D}$ | —·— |
| 17 | 145 | $\bar{D}$, $\bar{C}$ D | 122 | A, B $\bar{C}$ | —··— |
| 18 | 144 | $\bar{D}$, $\bar{C}$ D, $\bar{B}$ C D | 143 | A, $\bar{B}$ C D, B $\bar{C}\,\bar{D}$ | —···— |
| 19 | 125 | E F | 142 | A, B C D, B $\bar{C}\,\bar{D}$ | —····— |

In order that the operation of the logic circuitry may be seen more clearly, the operation for the circuitry of a few units will now be described with reference to FIGS. 6 to 8.

Assuming that the particular car desires to be unit No. 1, in which case the signal emitted would be a single dot, a jumper wire connects terminal 116 with terminal AA. Terminal BB could be connected with terminal 109 in order to provide the beep logic A; however, this is not necessary since the A side of the flip flop 91 is connected into the OR gate 152.

In analyzing the circuit, it should first be noted that the signal appears on line 75—and therefore, the transceiver 25 is actuated to transmit only all or part of the last 4 seconds of the 16-second cycle. This is because AND gate 149 will permit a signal on line 75 only when flip flop 95 is in its E state and flip flop 96 is in its F state, i.e., when a signal appears on the E side of flip flop 95 and the F side of the flip flop 96. These conditions occur only during the last 4 seconds of each 16-second cycle, i.e., from the beginning of the 13th second to the end of the 16th second.

With terminal AA connected to terminal 116, a signal will appear on the line 75 only when there is the combination of $\bar{B}$ $\bar{C}$ $\bar{D}$. This occurs only during the first half of the 13th second of the cycle as indicated by brace 155 in FIG. 8. ANd, it can be seen that—although there is a signal on terminal AA and the 400 Hz oscillator 151 during the entire half second, there is a signal on line A only during the last quarter second of the one-half second span. This causes a single dot of one-fourth second span.

It should be noted in the just described operation, and in all other combinations of the circuitry disclosed in Table A, that the transceiver 25 is turned on only from a time one-fourth second before the beep code and then during the time of the beep code. Therefore, the transceiver 25 will not blank out other transceivers more than is necessary. The transceiver 25 is turned on one-fourth second before the beep code in order to assure that no part of the beep code is missed.

If the unit to be designated is unit No. 3—where the signal is to be three dots—the terminal AA is connected to terminal 129 in order that a signal will appear during the time span where there occurs $\bar{C}$ $\bar{D}$, or $\bar{B}$ C $\bar{D}$. In Fig. 8, this time span—which occurs during the 13th second and the first half of the 14th second, is indicated by 1½ second brace 156 in FIG. 8. It can be seen that A appears at AND gate 150 three times during the time span to cause the three one-fourth second dots. Here again, it will be noted that the transceiver 25 is turned on one-fourth second before the first dot and is turned off immediately at the end of the last dot.

If the unit to be designated were No. 8, terminal AA would be connected to terminal 146. This would cause the transceiver 25 to be actuated during the period of $\bar{D}$ or $\bar{B}$ $\bar{C}$ D. This period which extends 2½ seconds from the beginning of the 13th second through the first half of the 15th second, is indicated by brace 157 in FIG. 8. Terminal BB is connected to terminal 147. And accordingly, the beep signal will be generated during the periods that flip flop 91 is in the A state or the condition $\bar{C}$ D exists. In this case, a dot occurs during the second quarter and fourth quarter of the 12th second and the second quarter of the 14th second. The dot occurring during the last quarter of the 13th second is blended with the first half second of the signal occurring during the 15th second to form a dash. In this last mentioned connection, it will be noted that the condition $\bar{C}$ D occurs during the entire 15th second. However, the signal during the last half of the 15th second will not be heard since the transceiver 25 has been turned off at the end of the first half of the 15th second.

If the unit to be designated is unit No. 9, terminal AA is connected to terminal 145 in order that the transmitter will be on during the time there exists the condition $\bar{D}$ or $\bar{C}$ D. This time span is indicated by 3-second brace 158 in FIG. 8. Terminal BB is connected to terminal 120 in order that there will be a beep signal generated during the condition B D, as well, as the condition A. (As mentioned above, the beep signal will occur on every condition A during the time that the transmitter is transmitting during the last 4 seconds of the 16-second cycle.)

With the circuitry thus connected, there will appear four quarter second dots during the 13th and 14th seconds of the cycle. Then, there will be no signal during the first quarter of the 15th second. Then, flip flop 91 being in the A state causes a signal during the second quarter of the 15th second, which signal blends with the signal occuring during the last half of the 15th second (when condition B D occurs) to form the three-quarter second dash.

Should it be desired to designate the unit 19, the terminal AA is connected to terminal 125 which provides a constant signal. However, as mentioned above, the AND gate 149 prevents the transceiver 25 from being turned on except during the last 4 seconds of the 16-second cycle (when flip flop 95 is in its E state and flip flop 96 is in its F state). This 4-second time span is indicated by brace 159 in FIG. 8. The beep logic is generated by connecting terminal 142 to the terminal BB. Therefore, there would be a signal during the conditions of A, or B C D, or B $\bar{C}$ $\bar{D}$, during the time that the transceiver is on. In this case, the signal for the condition A occurring during the second quarter of the 13th second blends with the signal resulting from the condition B C D during the last half of the 13th second to form a dash. Then, the condition A causes a series of four dots during the second and fourth quarters of the 14th and 15th seconds respectively. And, the signal from the A condition in the second quarter of the 16th second blends with the one half second signal resulting from the condition B $\bar{C}$ $\bar{D}$ during the last half of the 16th second to form the final dash of the signal consisting of a dash, four dots, and a dash.

While only a few embodiments of the present invention have been shown and described in detail, it will be apparent to those skilled in the art that such is by way of illustration only and that numerous changes may be made thereto without departing from the spirit of the present invention. For example, the remote transmitter could be mounted and contained within the officer's helmet or could be mounted on the rear side of his badge. Naturally, such transmitters would be smaller than indicated in the drawings.

I Claim:

1. In a communication system:
a hand held remote transmitter, said remote transmitter comprising:
audio circuit means for broadcasting audio message at a first given frequency;
means for broadcasting at a signal at a second different frequency;
and switch means for selectively causing said transmitter to broadcast at said first given frequency or said second different frequency;
an automotive vehicle in proximity to said remote transmitter;
radio means having a first and a second input line and in said vehicle for broadcasting an intelligence signal to a position far remote from the vehicle when there is present on said first input line a signal and present on said second input line an intelligence signal;
intermediate actuation means in said vehicle connected to said first and second input lines of said radio means for receiving said signals from said remote transmitter, said intermediate actuation means comprising:
first circuit means for causing a signal to be present on said first input line whenever a signal is received from said remote transmitter at said first given frequency;
second circuit means for amplifying a signal received from the remote transmitter at said first given frequency and feeding it into the second input line of said radio means where it is broadcast;
and third circuit means responsive to a signal from said remote transmitter to said second given frequency for feeding a brief signal at regular intervals to said second input line of said radio means where it is broadcast.

2. The system set forth in claim 1 including:
means connecting said third circuit means to said first input line for causing a signal on said first input line substantially only at such time as said third circuit means is feeding a brief signal.

3. The communication system set forth in claim 1 wherein said intermediate actuation means includes:
fourth circuit means responsive to a signal from said remote transmitter at said second given frequency for causing a loud noise in the area of the vehicle.

4. The communication system set forth in claim 3 wherein:
said fourth circuit means causes lights on said vehicle to flash when said signal at said second given frequency is received by said intermediate actuation means.

5. The communication system set forth in claim 3 wherein;
said vehicle has a siren;
and said fourth circuit means include a relay switch which turns on said vehicle siren to make said loud noise.

6. The communication system set forth in claim 2 wherein said brief signal from said third circuit means is no more than one-third of the interval between each of two brief signals.

7. The communication system set forth in claim 1 wherein:
said radio means is a normal transceiver of a police vehicle and has an input socket adapted to receive a multi-pin jack of a microphone having a push-to-talk switch wherein the push-to-talk switch is connected to said first input line and the audio signal of the microphone is connected to said second input line;
and said intermediate actuation means includes an output plug which is received into said input jack of said radio means.

8. In combination with a vehicle having a transceiver which can broadcast to a remote point an intelligence signal received into a second input line of the transceiver when a signal is received into a first input line of the transceiver,
intermediate actuation means having an output connected to said first and second input lines, said intermediate actuation means being responsive to a signal at a given frequency from a transmitter, said intermediate actuation means including:
one circuit means for feeding a brief signal at regular intervals to said second input line in response to the continual reception of a signal at said given frequency.

9. The combination set forth in claim 8 wherein:
each said brief signal is only no more than one-third of the interval between two brief signals.

10. The combination set forth in claim 8 wherein:
said brief signal is coded to identify the vehicle involved.

11. The combination set forth in claim 8 wherein:
said vehicle has a noisemaker;
and said intermediate actuation means includes:
circuit means for causing said noisemaker to be actuated in response to receipt by said intermediate actuation means of said signal at said given frequency.

12. The combination set forth in claim 8 wherein:
said vehicle has a light which flashes when energized;
and said intermediate actuation means includes circuit means connected to said light for energizing said light in response to receipt by said intermediate actuation means of said signal at said given frequency.

13. The combination set forth in claim 8 wherein:
said brief signal is a coded signal;
and said one circuit means causes a signal to appear on said first input line from a brief instant before said coded signal appears on said second input line until the end of the time period during which the desired coded signal appears on said second input line.

14. The combination set forth in claim 13 wherein:
said one circuit means has a transmit terminal and a beep logic terminal and a plurality of other terminals;
said one circuit means causes a signal to appear on said first input line as long as a signal is connected to said transmit terminal;
the time during which a signal appears on said transmit terminal is dependent on the particular other terminal connected to said transmit terminal;
said one circuit means causes a coded signal of dots and/or dashes to appear on said second input line from an instant after a signal appears at said transmit terminal until the signal at said transmit terminal ceases;
and the code of said coded signal is dependent upon the particular other terminal which is connected to said beep logic terminal, whereby connecting different ones of said other terminals to transmit terminal and beep logic terminal provides a predetermined number of signals of combinations of dots and dashes.

15. In a communication system, a transmitter having an antenna, said transmitter comprising:
audio circuit means for broadcasting an audio message at a first given frequency, said audio circuit means comprising:
an audio amplifier and a voltage controlled oscillator with audio amplifier having its output connected to the voltage controlled oscillator such that variations in the voltage output of the amplifier will cause variations in the frequency of the output of said oscillator;
a microphone having its output connected into said audio amplifier;
a high frequency carrier wave generator and a switch with the generator connected to said antenna of said transmitter through said switch in said transmitter, said switch being connected to the output of said oscillator for opening the circuit between the carrier wave generator and the antenna one half of each cycle of output of said oscillator, whereby the voltage controlled oscillator causes the carrier wave to be generated out of said antenna in pulses which are a function of the frequency output of said oscillator.

16. The combination set forth in claim 15 including:

second switch means for selectively switching said oscillator out of connection with said audio amplifier and into a connection with a voltage source of constant frequency which is different than the frequency of the output of the audio amplifier.

17. The combination set forth in claim 16 including:

a normally push-to-talk switch means connected to all circuitry of said transmitter to cause power to be supplied to said circuitry only when pressure is supplied by a user to said last mentioned switch means;

and switch means in said second switch means for connecting power to all circuitry at all times that said second switch means connects said oscillator to said constant frequency voltage source.

18. In a communication system characterized by a transceiver having first and second input lines where a signal on said first input line will cause the transceiver to transmit any signal on said second input line, a transceiver input unit comprising:

reception means for receiving an incoming signal;

coded beep circuitry means connected to said reception means and to said first and second input lines for causing a coded signal to appear on said second input line at regular intervals with the space between each coded signal being at least three times as long as the signal, and for causing a signal to appear on said first input line from a brief instant before said coded signal appears on said second input line until the end of the time period during which the desired coded signal appears on said second input line.

19. The combination set forth in claim 18 wherein:

said coded signal is a series of dots and dashes.

20. The combination set forth in claim 19 wherein:

said coded circuitry means has a transmit terminal and a beep logic terminal and a plurality of other terminals;

said coded beep circuitry means causes a signal to appear on said first input line as long as a signal is connected to said transmit terminal;

the time during which a signal appears on said transmit terminal is dependent on the particular other terminal connected to said transmit terminal;

said coded beep circuitry means causes a coded signal to appear on said second input line from an instant after a signal appears at said transmit terminal until the signal at said transmit terminal ceases;

and the code of said coded signal is dependent upon the particular other terminal which is connected to said beep logic terminal, whereby connecting different ones of said other terminals to said transmit terminal and beep logic terminal gives a predetermined number of combinations of coded signals.

21. The combination set forth in claim 20 wherein said coded beep circuitry means includes:

oscillator means for generating at a predetermined frequency said signal which appears on the second input line, whereby said circuitry means gives a coded signal which is a function of the dots and/or dashes in the code and the frequency of each dot and/or dash.

* * * * *

PO-1050
(5/69)

UNITED STATES PATENT OFFICE
CERTIFICATE OF CORRECTION

Patent No. 3,668,526 Dated June 6, 1972

Inventor(s) Jerome S. Raskin

It is certified that error appears in the above-identified patent and that said Letters Patent are hereby corrected as shown below:

In the Abstract, line 13, after "33-1/3" insert--%--.

Column 2, line 22, after "input" insert--unit--;
line 55, remove "preferable" and insert--preferably--.

Column 3, line 53, remove "mHz" and insert--kHz--;

line 57, before "radiated" remove "the" and insert --and--.

Column 8, line 67, remove "C D" and insert--$\bar{C}$ $\bar{D}$--;

line 73, remove "$\bar{C}$ $\bar{D}$" and insert--C D--.

Column 9, line 41, remove "to" and insert--at--;

line 43, remove "broadcast" and insert--broadcasted--.

Signed and sealed this 23rd day of January 1973.

(SEAL)
Attest:

EDWARD M.FLETCHER,JR.
Attesting Officer

ROBERT GOTTSCHALK
Commissioner of Patents